(12) United States Patent
Ishikawa et al.

(10) Patent No.: US 7,151,129 B2
(45) Date of Patent: Dec. 19, 2006

(54) CARBON NANOFIBER-DISPERSED RESIN FIBER-REINFORCED COMPOSITE MATERIAL

(75) Inventors: Takashi Ishikawa, Tokyo (JP); Yutaka Iwahori, Tokyo (JP); Shin Ishiwata, Tokyo (JP); Shunji Higaki, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 336 days.

(21) Appl. No.: 10/643,969

(22) Filed: Aug. 20, 2003

(65) Prior Publication Data

US 2004/0067364 A1    Apr. 8, 2004

(30) Foreign Application Priority Data

Oct. 8, 2002  (JP) ............................. 2002-295494

(51) Int. Cl.
*C08K 3/08* (2006.01)
*C08K 3/26* (2006.01)
*B32B 9/00* (2006.01)

(52) U.S. Cl. ...................... 524/414; 524/439; 428/368; 428/411.1

(58) Field of Classification Search ................ 524/424, 524/439; 428/368, 411.1
See application file for complete search history.

(56) References Cited

U.S. PATENT DOCUMENTS 6,654,229 B1 * 11/2003 Yanagisawa et al. ....... 361/502

FOREIGN PATENT DOCUMENTS

JP        10-88256        4/1998

OTHER PUBLICATIONS

Spindler-Ranta, et al., Carbon Nanotube Reinforcement of a Filament Winding Resin (47th International SAMPE Symposium, May 12-16, 2002) pp.1775-1787.
Gilbert et al., Nanoparticle Modification of Epoxy Based Film Adhesives (47th International SAMPE Symposium, May 12-16, 2002) pp. 41-50.

* cited by examiner

*Primary Examiner*—Kriellion Sanders
(74) *Attorney, Agent, or Firm*—Westerman, Hattori, Daniels & Adrian, LLP.

(57) ABSTRACT

The resin in a fiber-reinforced resin material that uses a single fiber reinforcing ply or a number of fiber reinforcing plies for reinforcing the resin material is reinforced by dispersing carbon nanofibers therein, whereby a fiber-reinforced composite resin material having improved strength such as compressive strength is provided. In a carbon nanofiber-dispersed resin fiber-reinforced composite material 1, an uncured resin 4 having carbon nanofibers 5 dispersed therein is impregnated into a number of fiber reinforcing plies 2a laid one upon another. Upon curing the resin 4, the strength of the matrix 3 itself is increased through the carbon nanofibers 5 dispersed in the resin 4. Moreover, the fiber reinforcement 2 and the resin 4 are joined together strongly by the carbon nanofibers 5, and hence the strength of the composite material, for example the compressive strength, which hitherto has been dependent on the strength of the resin 4 only, is improved.

3 Claims, 3 Drawing Sheets

CARBON NANOFIBER-DISPERSED RESIN FIBER-REINFORCED COMPOSITE MATERIAL

BACKGROUND OF THE INVENTION

1. Field of the Invention

The present invention relates to a carbon nanofiber-dispersed resin fiber-reinforced composite material in which a resin having carbon nanofibers dispersed therein is impregnated into a laminated fiber reinforcement.

2. Description of the Related Art

Conventionally, fiber-reinforced composite materials are manufactured by impregnating a resin as a matrix into a laminate of fiber reinforcement made of a fiber woven material (e.g. a carbon fiber woven fabric) comprising carbon fibers, glass fibers or the like. Such fiber-reinforced composite materials are light in weight, and moreover have extremely high strength in-plane loading, in particular in the direction of tension of the fibers direction in the woven fabric, and thus have excellent specific strength and specific modulus; utilizing such properties, such fiber-reinforced composite materials are widely used as structural materials in aircraft and space equipment, and also in general industry.

However, this type of fiber-reinforced composite material has highly anisotropic properties, with the strength in a direction perpendicular to the laminate planes being extremely low compared with the strength within the laminate planes, which is generally the direction in which the fibers extend. In such a laminate type fiber-reinforced composite material, the strength of the fibers contributes little to the strength of the composite material in directions other than within the laminate planes, and hence breakage of laminate type composite materials related to the strength dependent on the resin is critical occasionally. That is, in a fiber-reinforced composite material as described above, even though the in-plane strength can be improved by reinforcing the fiber reinforcements, the strength with regard to the form of breakage dependent on the strength of the resin cannot be improved, and hence this resin-dependent strength may determine the overall strength of the fiber-reinforced composite material.

The interlaminar strength for a laminate type composite material is a representative strength dependent on the strength of the resin. Attempts have thus been made to increase the interlaminar strength using techniques such as improving or modifying the resin, or threading Kevlar or carbon yarn through the fiber reinforcement layers. However, in the case of a composite material that has such yarns that thread through the fiber reinforcement layers, stress is prone to being concentrated around the holes where yarns are threaded through the thickness of reinforcements, and hence a drop in the strength within the laminate planes may be brought about.

On the other hand, a method in which carbon nanotubes are dispersed in an epoxy resin has been disclosed (e.g. Sean Spindler Ranta and Charles E. Bakis, 'Carbon Nanotube Reinforcement of a Filament Winding Resin' (USA), 47th International SAMPE Symposium Proceedings, May 12 to 16, 2002, p. 1775 to 1787). This epoxy resin having carbon nanotubes dispersed therein is used in filament winding. However, this attempt was concluded that the carbon nanotubes dispersed resin did not affect the mechanical properties of the filament winding composites.

SUMMARY OF THE INVENTION

In view of the above, it is desired to improve the strength in directions other than the direction of extension within the laminate planes by using, as a matrix impregnated into a laminated fiber reinforcement, a resin having dispersed therein fibers that are extremely fine but have high strength.

It is an object of the present invention to reinforce the resin in a fiber-reinforced resin material that uses fiber layers as reinforcements for reinforcing a resin material, and thus provide a fiber-reinforced composite resin material having improved strength that has been dependent on the resin with conventional fiber-reinforced composite materials in the past, for example interlaminar strength and compressive strength.

To attain the above object, a carbon nanofiber-dispersed resin fiber-reinforced composite material according to the present invention comprises a fiber reinforcement having impregnated therein a matrix comprising an uncured resin having carbon nanofibers dispersed therein. The carbon nanofibers mentioned here may be publicly known carbon nanotubes or carbon nanofibers in which carbon network layers each having a cup shape with no base are built up on top of one another, or may also be carbon nanotubes or carbon nanofibers having a herringbone structure inclined at a fixed angle to the fiber axis, carbon nanotubes or carbon nanofibers in which carbon network layers have grown in concentric circles, or carbon nanotubes or carbon nanofibers in which carbon network layers have grown perpendicular to the axis. Moreover, regarding the size, the carbon nanofibers are publicly known carbon fibers obtained using a vapor phase growth method having a diameter of not more than 200 nm and an aspect ratio of at least 0.1.

According to this carbon nanofiber-dispersed resin fiber-reinforced composite material, when the matrix has been cured, the strength and modulus of the matrix itself is increased by the carbon nanofibers intermingled throughout the matrix, and moreover based on a composite potential between the fiber reinforcement and the matrix, the fiber reinforcement and the resin are joined together strongly via the carbon nanofibers, and hence the strength of the fiber-reinforced composite material, which hitherto has been dependent on the strength of the resin only, is improved.

The carbon nanofiber-dispersed resin fiber-reinforced composite material can be formed by making the fiber reinforcement comprise a single fiber reinforcing ply or a number of fiber reinforcing plies laminated together, and coating the matrix onto the fiber reinforcement or sandwiching the matrix between adjacent fiber reinforcing plies, thus impregnating the matrix into the fiber reinforcement. The uncured resin having the carbon nanofibers dispersed therein can be disposed uniformly as a matrix on the fiber substrate by being coated onto the fiber reinforcement, or being injected into a mold into which the fiber reinforcement have been placed in advance.

The uncured matrix penetrates into the fiber reinforcement from the surfaces thereof, and can thus be impregnated uniformly into the fiber reinforcement.

In the carbon nanofiber-dispersed resin fiber-reinforced composite material, the final volume fraction of the fiber reinforcements may be made to be in a range of 10% to 70%. By setting the final volume fraction of the fiber reinforcement to be in this range, a good balance can be achieved between the in-plane strength, which is based primarily on the fiber reinforcement, and the strength other than the in-plane strength such as the compressive strength, which is based primarily on the matrix.

BRIEF DESCRIPTION OF THE DRAWINGS

FIG. 1 are views showing an example of a carbon nanofiber-dispersed resin fiber-reinforced composite material according to the present invention.

DESCRIPTION OF THE PREFERRED EMBODIMENTS

Figure 1A:
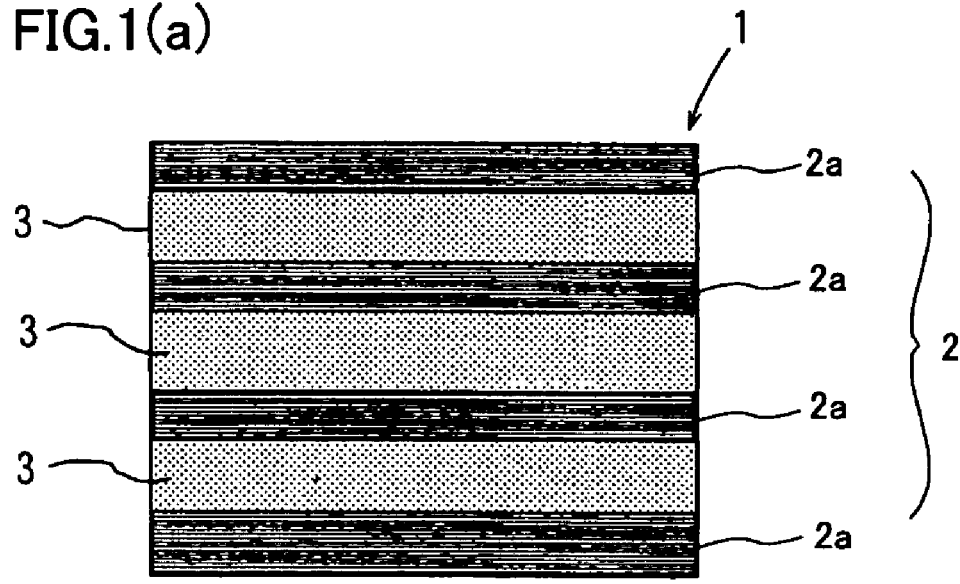
FIG. 1(a) is a schematic sectional view.

Following is a description of an embodiment of the carbon nanofiber-dispersed resin fiber-reinforced composite material according to the present invention, with reference to the appended drawings. FIG. 1 are views showing an example of the carbon nanofiber-dispersed resin fiber-reinforced composite material according to the present invention; FIG. 1(a) is a schematic sectional view, and FIG. 1(b) is a schematic view showing part of FIG. 1(a) enlarged.

Figure 1B:
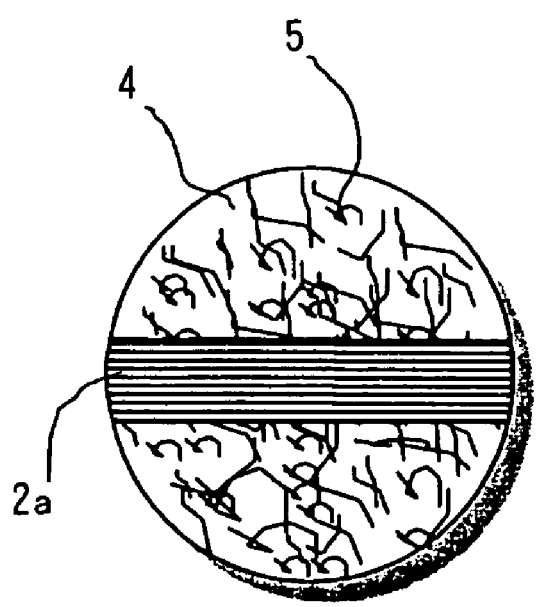
FIG. 1(b) is a schematic view showing part of FIG. 1(a) enlarged.

In the embodiment shown in FIG. 1, as shown in FIG. 1(a), the carbon nanofiber-dispersed resin fiber-reinforced composite material 1 comprises a fiber reinforcement 2 in the laminated form of a number of fiber reinforcing plies 2a, and layers of a matrix 3 each of which is sandwiched between adjacent fiber reinforcing plies 2a. The matrix 3 is initially in the form of an uncured resin 4 having carbon nanofibers 5 dispersed therein. The uncured resin 4 is applied onto the surfaces of fiber reinforcing plies 2a using suitable means such as coating or injection into a mold, and is then cured by heating or the like. The state after the resin 4 has been cured to form the matrix 3 is shown enlarged in FIG. 1(b). The carbon nanofibers 5 are carbon fibers that are extremely thin and short compared with the fibers used in the fiber reinforcing ply 2a, and in the state in which the resin 4 has been cured, an extremely large number of the carbon nanofibers 5 extend out in random directions.

Upon being applied onto the surfaces of the fiber reinforcing plies 2a, the resin 4 impregnates into the fiber reinforcing plies 2a; after that, the resin 4 is cured, whereby a composite material is formed from the fiber reinforcement 2 together with the matrix 3 comprising the resin 4 reinforced with the carbon nanofibers 5.

When the resin 4 has been cured, the strength and modulus of the matrix 3 itself is increased through the extremely large number of carbon nanofibers 5 intermingled throughout the matrix 3, and moreover based on a composite potential between the fiber reinforcement 2 and the matrix 3, the fiber reinforcement 2 and the matrixes 3 are strongly bound together via the carbon nanofibers 5. There is thus a marked increase in strengths of the fiber-reinforced composite material other than the in-plane strength, e.g. the inter-layer strength and so on, which with conventional fiber-reinforced composite materials has been dependent purely on the strength of the cured resin 4.

EXAMPLES

Following are examples of the manufacture of the carbon nanofiber-dispersed resin fiber-reinforced composite material 1 according to the present invention.

For the fiber reinforcement 2, a carbon fiber woven fabric C06343 (made by Toray Industries, Inc.) was cut in advance to prepare a prescribed number of plies to be laid one upon another as fiber reinforcing plies 2a. In this example, as the carbon nanofibers 5, cup stack type carbon nanofibers 'Carbere' (registered trademark, made by GSI Creos Corporation) were used for instance, and as the resin 4, a general-purpose resin Epikote 827 ('Epikote' is a registered trademark, made by Japan Epoxy Resins Co., Ltd.) was used. The amount of the carbon nanofibers 5 was made to be 35 wt % or 20 wt % relative to the amount of the resin 4. The carbon nanofibers 5 were dispersed in the uncured resin 4, and then Epikure W ('Epikure' is a registered trademark, made by Japan Epoxy Resins Co., Ltd.) was mixed in as a curing agent, and the mixture was stirred thoroughly. After the stirring, air that had got in during the stirring was removed through thorough deaeration using a vacuum tank or a vessel that could be maintained in a vacuum state, whereby an uncured matrix 3 comprising the resin 4 with the carbon nanofibers 5 dispersed therein was obtained.

The resin 4 having the carbon nanofibers 5 dispersed therein was coated onto the fiber reinforcing plies 2a prepared from the carbon fiber woven fabric, and then the fiber reinforcing plies 2a were laminated together, and the resulting laminate was heated to cure the resin 4. Here, the temperature was held at 100° C. for 2 hours, and then curing was carried out for 4 hours at 175° C., thus obtaining a formed article. During the heating, it is preferable to apply pressure from each side to the laminate of the fiber reinforcement 2 onto which the resin 4 has been coated, thus promoting impregnation of the matrix 3 into the fiber reinforcing plies 2a.

Figure 2:
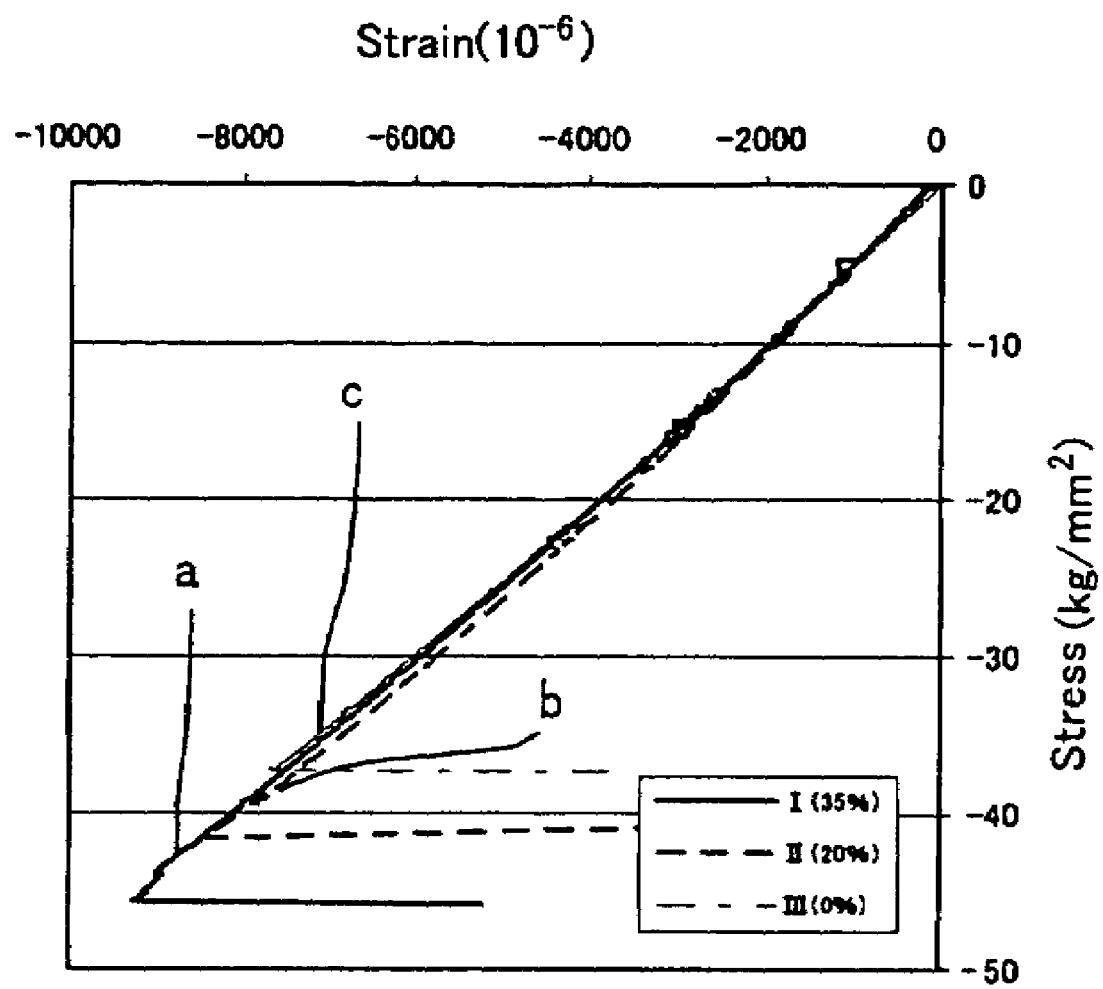
FIG. 2 is a graph showing results of compressive strength tests carried out on carbon nanofiber-dispersed resin fiber-reinforced composite materials according to the present invention.

The carbon nanofiber-dispersed resin carbon fiber-reinforced composite materials formed in the present examples were subjected to compressive strength tests. For comparison, a composite material that contained the carbon fiber woven material such that the amount of the fiber reinforcement was the same as in the above examples in terms of the fiber content, but was reinforced with a resin (Epikote 827/Epikure W) not having carbon nanofibers dispersed therein was also subjected to the same test. FIG. 2 is a graph showing the test results. In FIG. 2, the horizontal axis shows the strain obtained by a strain gauge stuck to the test piece, and the vertical axis shows the stress, which is the load divided by the cross-sectional area of the test piece.

According to the test results, with regard to the compressive strength, the fiber-reinforced composite material "a" having the highest amount of carbon nanofibers dispersed in the resin (35 wt % relative to the resin) was able to withstand the highest stress and strain, and this was followed by the fiber-reinforced composite material "b" having 20 wt % of carbon nanofibers dispersed in the resin and then the fiber-reinforced composite material "c" not having carbon nanofibers dispersed in the resin (carbon nanofiber content 0 wt %) in that order. In this way, it was ascertained that a carbon nanofiber-dispersed resin fiber-reinforced composite material obtained by impregnating a carbon fiber woven material with a resin in which has been dispersed 20 to 35 wt % of carbon nanofibers relative to the resin ("a" or "b") has better compressive strength than a fiber-reinforced composite material obtained using a resin not having carbon nanofibers dispersed therein. It is conjectured that, whereas conventional carbon nanotubes and carbon nanofibers have a structure having a smooth outer peripheral surface so that a resin slides easily thereover, in the case of cup stack type carbon nanotubes or carbon nanofibers in particular, the carbon nanotubes or carbon nanofibers have a structure in which carbon network layers each having a cup shape are built up on top of one another, and hence at an outer peripheral part where the outer peripheral rims of the cup shapes are arranged in a line, the affinity to the resin is good, and the mechanical friction with the resin is increased, and this contributes to the increase in strength described above.

Figure 3:
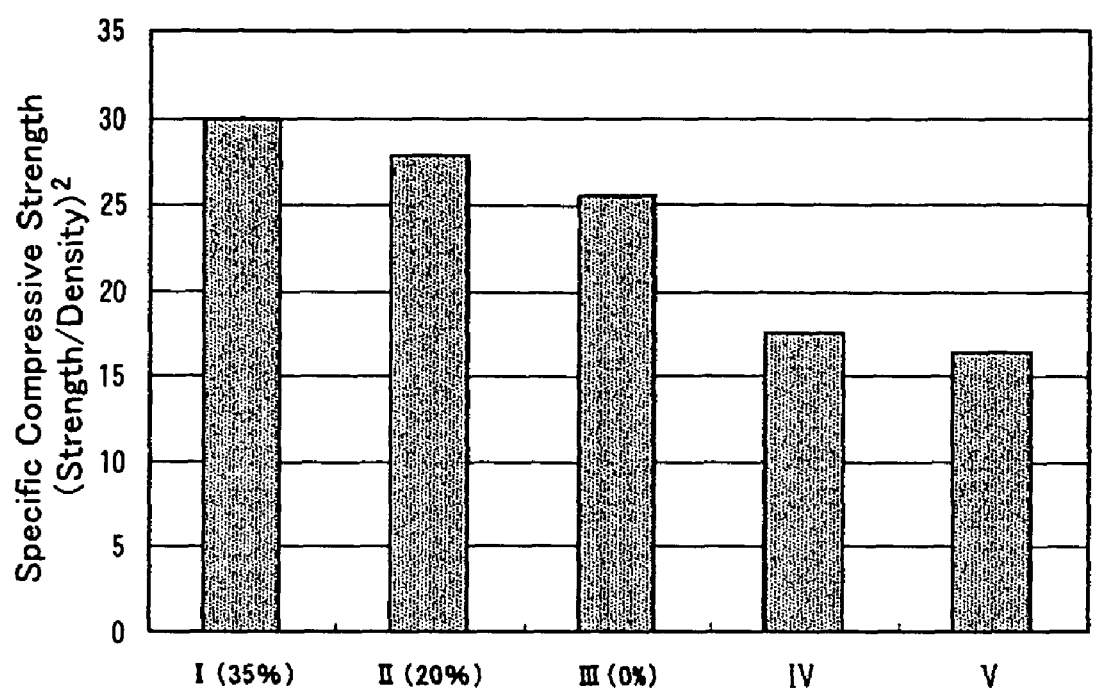
FIG. 3 is a bar chart showing the specific compressive strength of the carbon nanofiber-dispersed resin fiber-reinforced composite materials according to the present invention.

FIG. 3 is a bar chart showing a comparison of the specific strength of the carbon nanofiber-dispersed resin fiber-reinforced composite materials according to the present invention, i.e. the strength of each composite material divided by the density thereof, with that of materials conventionally used in aircraft and the like. As can be seen from FIG. 3, the carbon nanofiber-dispersed resin composite materials according to the present invention (I and II) have a specific strength approximately 44% to 77% higher than that of the conventional metallic materials (IV and V), and hence can be said to be materials having good weight efficiency.

It is considered that the carbon nanofiber-dispersed resin fiber-reinforced composite material according to the present invention can be used, for example, as a structural material in aircraft, other objects that fly through the air, and equipment used in space, and in members of medical equipment through which one wishes to transmit radiation such as X-rays, and casing for home electrical equipment such as personal computers which one wishes to make light in weight, or in strength-giving members of sports equipment such as fishing rods, golf club shafts and tennis racket frames, or in members of measuring equipment, or exterior decor of vehicles such as automobiles and motorbikes, or members of structures such as buildings that are desired in particular to be light in weight and high in strength. Moreover, the carbon nanofiber-dispersed resin fiber-reinforced composite material according to the present invention is not only light in weight and high in strength, but reinforcement can of course also be carried out with regard to electrical conductivity and thermal conductivity.

As described above, in the present invention, a resin having carbon nanofibers dispersed therein is used as a matrix that is impregnated into the fiber reinforcement. As a result, it is possible to provide a fiber-reinforced composite material that has increased strength, and is advantageous in terms of weight and strength compared with conventional fiber-reinforced composite materials. The carbon nanofiber-dispersed resin fiber-reinforced composite material according to the present invention has excellent compressive strength in particular, and hence is useful for reducing the weight of members that have hitherto been subject to restrictions in terms of compressive strength, and can thus be used in all kinds of industries such as the aerospace industry for aircraft, space equipment and so on, the energy industry for wind power generation and so on, the automobile industry, and the sports industry. The carbon nanofiber-dispersed resin fiber-reinforced composite material according to the present invention thus exhibits extremely good industrial effects.

What is claimed is:

1. A carbon nanofiber-dispersed resin fiber-reinforced composite material comprising:
    a fiber reinforcement; and
    a matrix that comprises an uncured resin and carbon nanofibers dispersed in said uncured resin and is impregnated into said fiber reinforcement;
    wherein the carbon nanofibers have a structure in which cup-shaped carbon net layers are sequentially stacked one on top of the other; and
    wherein a final volume fraction of said fiber reinforcement is in a range of 10% to 70% of the composite material.

2. The carbon nanofiber-dispersed resin fiber-reinforced composite material according to claim 1, wherein said fiber reinforcement comprises a single fiber reinforcing ply, and said matrix is coated onto said fiber reinforcing ply, and is thus made to impregnate into said fiber reinforcing ply.

3. The carbon nanofiber-dispersed resin fiber-reinforced composite material according to claim 1, wherein said fiber reinforcement comprises a number of fiber reinforcing plies laid one upon another, and said matrix is coated onto said fiber reinforcing plies, or is sandwiched between adjacent fiber reinforcing plies, and is thus made to impregnate into said fiber reinforcing plies.

* * * * *

UNITED STATES PATENT AND TRADEMARK OFFICE
CERTIFICATE OF CORRECTION

PATENT NO. : 7,151,129 B2
APPLICATION NO. : 10/643969
DATED : December 19, 2006
INVENTOR(S) : Takashi Ishikawa et al.

It is certified that error appears in the above-identified patent and that said Letters Patent is hereby corrected as shown below:

On the Title page, Item (73): Assignee

Please insert the Second Assignee Information which should be,

--GSI Creos Corporation, Tokyo (JP)--

Signed and Sealed this

Twenty-ninth Day of May, 2007

JON W. DUDAS
*Director of the United States Patent and Trademark Office*